United States Patent
Hu et al.

(10) Patent No.: US 8,127,269 B2
(45) Date of Patent: Feb. 28, 2012

(54) TRANSFORMING A FLOW GRAPH MODEL TO A STRUCTURED FLOW LANGUAGE MODEL

(75) Inventors: Jie Hu, Toronto (CA); Raymond L. Kong, Markham (CA); Curtis Miles, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1684 days.

(21) Appl. No.: 11/161,463

(22) Filed: Aug. 4, 2005

(65) Prior Publication Data

US 2007/0033582 A1 Feb. 8, 2007

(51) Int. Cl.
*G06F 9/44* (2006.01)
*G06F 9/45* (2006.01)

(52) U.S. Cl. ........ 717/104; 717/105; 717/114; 717/136; 717/144

(58) Field of Classification Search ........................ None
See application file for complete search history.

(56) References Cited

U.S. PATENT DOCUMENTS 5,889,999 A * 3/1999 Breternitz et al. ............ 717/158
(Continued)

OTHER PUBLICATIONS

Mantell, "From UML to BPEL: Model Driven Architecture in a Web Services World", IBM developerWorks, Web Services, Sep. 9, 2003, retrieved Sep. 2, 2009, <http://lsdis.cs.uga.edu/SemWebProcess/material/ws-uml2bpel.pdf>.*

(Continued)

*Primary Examiner* — Thuy Dao
(74) *Attorney, Agent, or Firm* — Lee Law, PLLC; Christopher B. Lee (57) ABSTRACT

The invention provides a solution for transforming a flow graph model to a structured flow language model. In particular, the nodes in the flow graph model are traversed, and each node is mapped to an activity in the structured flow language model. When a node comprises a branch point, the corresponding branch region is identified and mapped. This process is repeated until all nodes in the flow graph model have been mapped to corresponding activities in the structured flow language model. In this manner, the desired nesting and containment relationships can be identified and generated in the structured flow language model.

26 Claims, 7 Drawing Sheets

U.S. PATENT DOCUMENTS

| | | | |
|---|---|---|---|
| 6,014,680 | A | 1/2000 | Sato et al. |
| 6,625,797 | B1* | 9/2003 | Edwards et al. ............ 716/18 |
| 6,877,150 | B1* | 4/2005 | Miller et al. ............ 716/18 |
| 7,703,071 | B2* | 4/2010 | Kuester et al. ............ 717/104 |
| 7,861,215 | B2* | 12/2010 | Tong et al. ............ 717/104 |
| 2005/0210455 | A1* | 9/2005 | Koehler et al. ............ 717/136 |
| 2006/0085560 | A1* | 4/2006 | Langworthy et al. ......... 709/246 |
| 2007/0033570 | A1* | 2/2007 | Kong ............ 717/104 |
| 2007/0245297 | A1* | 10/2007 | Kuester et al. ............ 717/104 |

OTHER PUBLICATIONS

Kong, "Modeling Business Processes in WebSphere Business Modeler for BPEL Transformation", IBM developerWorks, WebSphere, Jan. 2008, retrieved Oct. 15, 2009.*

"From UML to BPEL", K. Mantell, Sep. 2003, pp. 1-10, <http://lsdis.cs.uga.edu/SemWebProcess/material/ws-uml2bpel.pdf>.*

Fu et al., Analysis of interacting BPEL web services, May 2004, pp. 621-630, <http://delivery.acm.org/10.1145/990000/988756/p621-fu.pdf>.*

Charfi et al., An aspect-based process container for BPEL, Nov. 2005, 6 pages, <http://delivery.acm.org/10.1145/1110000/1101564/a4-charfi.pdf>.*

Kim et al., From an ebXML BPSS choreography to a BPEL-based implementation, Nov. 2004, pp. 1-11, <http://delivery.acm.org/10.1145/1130000/1120689/p1-kim.pdf>.*

Casse et al., "Une approche pour reduire la complexite du flot de controle dans les programmes C," Technique et Science Informatiques, vol. 21, No. 7, pp. 1009-1032, 2002.

Kiepuszewski et al., "On Structured Workflow Modelling," Lecture Notes in Computer Science, vol. 1789/2000, Springer-Verlag GmbH, ISSN: 0302-9743, Jun. 2000.

* cited by examiner

TRANSFORMING A FLOW GRAPH MODEL TO A STRUCTURED FLOW LANGUAGE MODEL

The invention relates generally to transforming a process model, and more particularly to a solution for transforming a flow graph model to a structured flow language model.

BACKGROUND ART

A process, such as a business process, is frequently modeled by a business analyst using a high level non-structured flow graph model, such as a Unified Modeling Language (UML) Activity Graph. Often, it is desirable for a modeling tool to transform the process model represented in a flow graph to a process model represented in a well-structured flow language, such as Business Process Execution Language for web services (BPEL).

In order to transform the flow graph model to a structured flow language model, desired nesting and containment relationships to be included in the structured flow language model must be determined. However, the flow graph model typically lacks this information. To this extent, a need exists for a solution for transforming a flow graph model to a structured flow language model in which the desired nesting and containment relationships can be identified and generated in the structured flow language model.

SUMMARY OF THE INVENTION

The invention provides a solution for transforming a flow graph model to a structured flow language model. In particular, nodes in the flow graph model are traversed, and each node is mapped to an activity in the structured flow language model. When a node comprises a branch point, the corresponding branch region is identified and mapped. This process is repeated until all nodes in the flow graph model have been mapped to corresponding activities in the structured flow language model. In this manner, the desired nesting and containment relationships can be identified and generated in the structured flow language model.

A first aspect of the invention provides a method of transforming a flow graph model to a structured flow language model, the method comprising: obtaining a reachable node in the flow graph model based on a current node; mapping the reachable node to an activity in the structured flow language model; mapping a branch region for the reachable node when the reachable node comprises a branch point; and repeating the obtaining and both mapping steps until all nodes in the flow graph model have been mapped.

A second aspect of the invention provides a system for transforming a flow graph model to a structured flow language model, the system comprising: a system for obtaining a reachable node in the flow graph model based on a current node; a system for mapping the reachable node to an activity in the structured flow language model; and a system for mapping a branch region for the reachable node when the reachable node comprises a branch point.

A third aspect of the invention provides a process modeling tool that includes: a system for managing one of the following: a set of structured flow language models and a set of flow graph models; a system for receiving a transform request for a flow graph model; and a system for transforming the flow graph model to a structured flow language model, wherein the system for transforming includes: a system for obtaining a reachable node in the flow graph model based on a current node; a system for mapping the reachable node to an activity in the structured flow language model; and a system for mapping a branch region for the reachable node when the reachable node comprises a branch point.

A fourth aspect of the invention provides a program product stored on a computer-readable medium, which when executed, transforms a flow graph model to a structured flow language model, the program product comprising: program code for obtaining a reachable node in the flow graph model based on a current node; program code for mapping the reachable node to an activity in the structured flow language model; and program code for mapping a branch region for the reachable node when the reachable node comprises a branch point.

A fifth aspect of the invention provides a computer-readable medium that includes computer program code to enable a computer infrastructure to transform a flow graph model to a structured flow language model, the computer-readable medium comprising computer program code for performing the method steps of the invention.

A sixth aspect of the invention provides a method of offering a service to a customer of transforming a flow graph model to a structured flow language model, the method comprising managing a computer infrastructure adopted to perform each of the steps of the invention; and receiving payment based on the managing step.

A seventh aspect of the invention provides a method of generating an environment for transforming a flow graph model to a structured flow language model, the method comprising: obtaining a computer infrastructure; and deploying means for performing each of the steps of the invention to the computer infrastructure.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a solution for transforming a flow graph model to a structured flow language model. In particular, the nodes in the flow graph model are traversed, and each node is mapped to an activity in the structured flow language model. When a node comprises a branch point, the corresponding branch region is identified and mapped. This process is repeated until all nodes in the flow graph model have been mapped to corresponding activities in the structured flow language model. In this manner, the desired nesting and containment relationships can be identified and generated in the structured flow language model.

Figure 1:
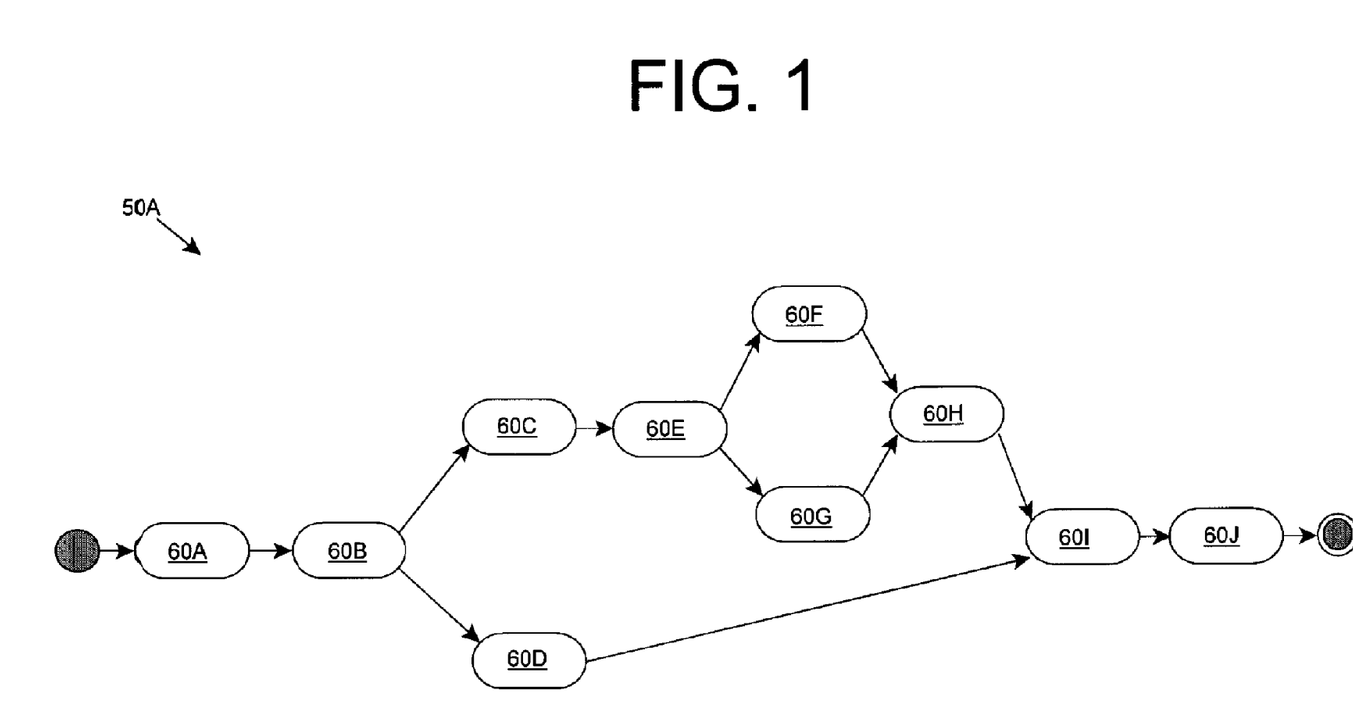
FIG. 1 shows an illustrative generalized non-structured flow graph model.

Turning to the drawings, FIG. 1 shows an illustrative generalized non-structured flow graph model 50A. In general, flow graph model 50A is shown including a plurality of nodes 60A-J having varying types. In particular, nodes 60A, 60C-D, 60F-G, and 60J comprise "simple" nodes. A simple node comprises any node that has a single input and a single output in flow graph model 50A. Another type of node comprises a "branch point", where control can flow in one or more possible directions. Flow graph model 50A is shown including two branch points, node 60B and node 60E. Typically, there are two types of branch points, a "concurrent branch point", at which output is concurrently produced at each of a plurality of concurrent paths of nodes, and an "exclusive branch point", at which output is produced at one of a plurality of possible paths of nodes. Each branch point has a corresponding "full merge point" type of node. Flow graph 50A is shown including two full merge points, node 60H and node 60I. As with branch points, there are generally two types of full merge points, a "concurrent full merge point", which comprises the earliest node in flow graph model 50A whose inputs can be traced back to every one of the plurality of concurrent paths of a concurrent branch point, and an "exclusive full merge point", which comprises the earliest node in flow graph model 50A whose inputs can be traced back to every one of the plurality of possible paths of an exclusive branch point.

Figure 2:
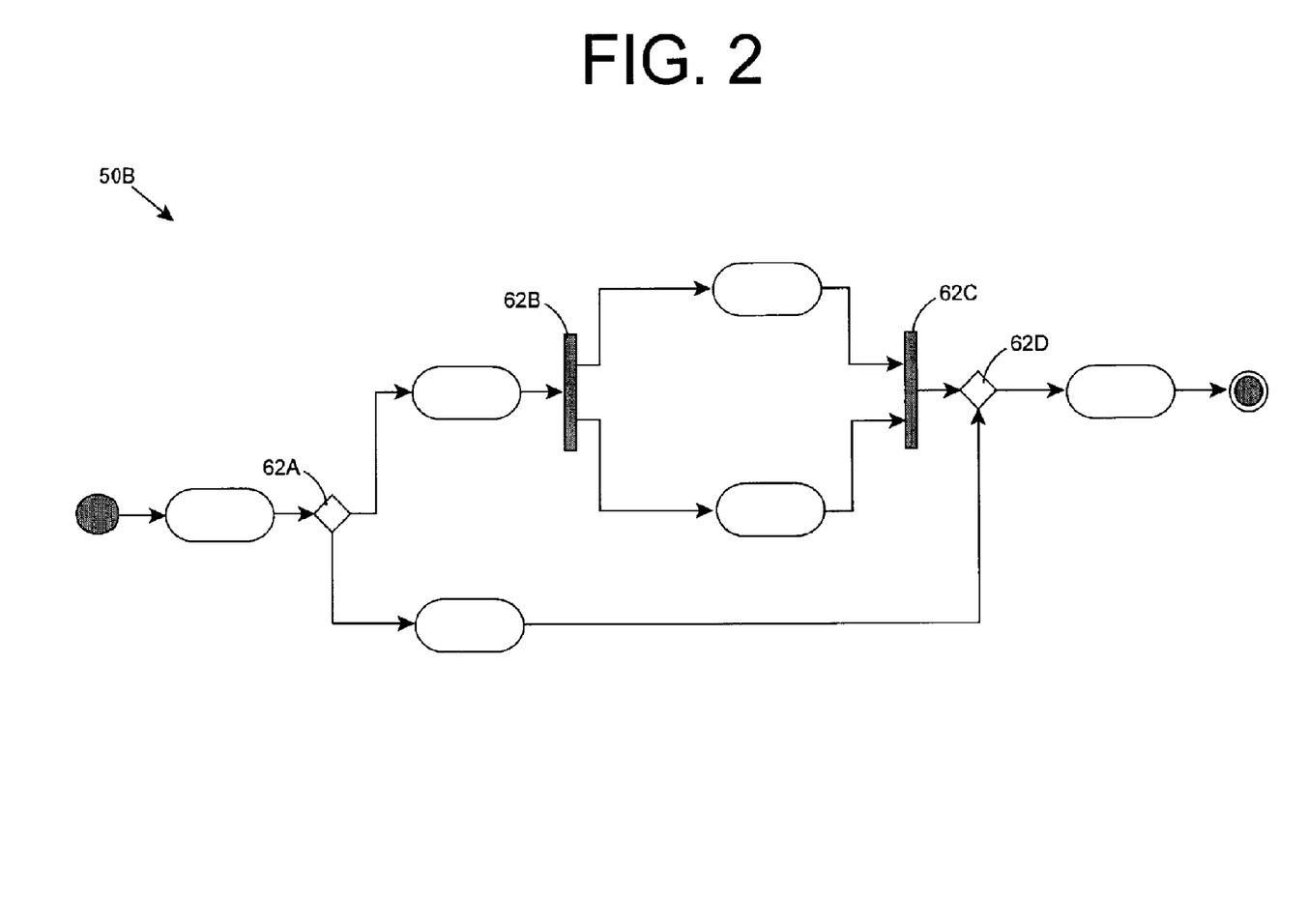
FIG. 2 shows an illustrative Unified Modeling Language (UML) Activity Graph.

Many types of flow graph modeling languages define specialized node types for branch points and/or full merge points. For example, FIG. 2 shows an illustrative flow graph model 50B, which comprises a Unified Modeling Language (UML) Activity Graph. Flow graph model 50B is based on flow graph model 50A (FIG. 1) and illustrates different types of nodes that can correspond to branch points and full merge points. To this extent, flow graph model 50A can comprise a generalized version of flow graph model 50B. In any event, node 62A of flow graph model 50B comprises a UML decision node, which is an exclusive branch point; node 62B comprises a UML fork node, which is a concurrent branch point; node 62C comprises a UML join node, which is a concurrent full merge point; and node 62D comprises a UML merge node, which is an exclusive full merge point. It is understood that these node types are only illustrative. Further, some flow graph modeling languages do not include specialized node types. In these cases, a type of branch point (exclusive or concurrent) can be determined by analyzing the conditions of the outgoing branches, while the type of full merge point can be determined by tracing the incoming paths to the corresponding branch point.

Figure 3:
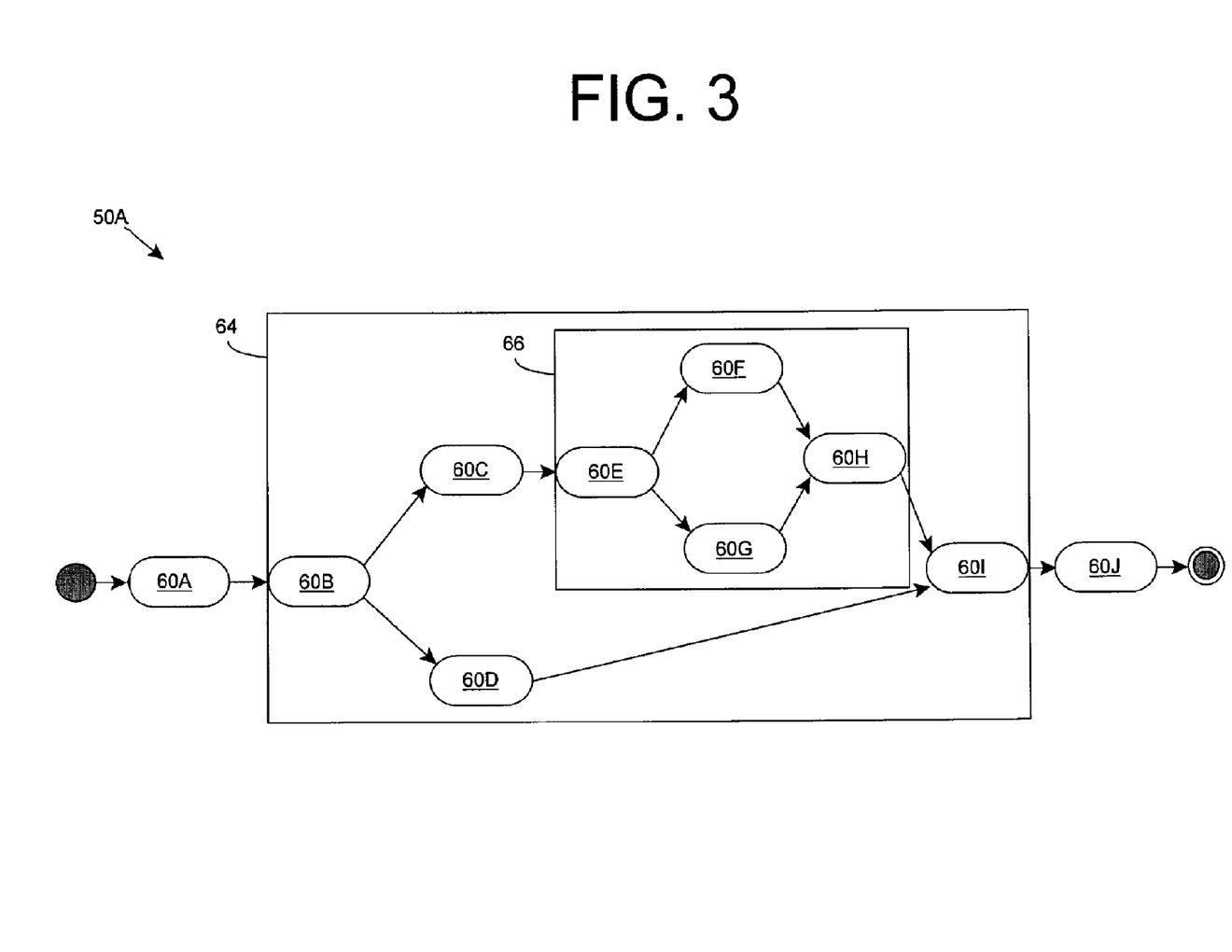
FIG. 3 shows the flow graph model of FIG. 1 with two branch regions identified.

Returning to FIG. 1, three types of regions can be defined within flow graph model 50A. In particular, a "sequential region" can comprise a set of nodes 60A-J that are connected without branching. In contrast, a "concurrent branch region" can comprise a set of nodes 60A-J that are encapsulated between a concurrent branch point and its corresponding concurrent full merge point, and an "exclusive branch region" can comprise a set of nodes 60A-J that are encapsulated between an exclusive branch point and its corresponding exclusive full merge point. For example, FIG. 3 shows flow graph model 50A with two branch regions 64, 66 identified.

Assuming, for purposes of illustration, that node 60B comprises an exclusive branch point and node 60E comprises a concurrent branch point, then branch region 64 would be an exclusive branch region while branch region 66 would be a concurrent branch region.

Figure 4:
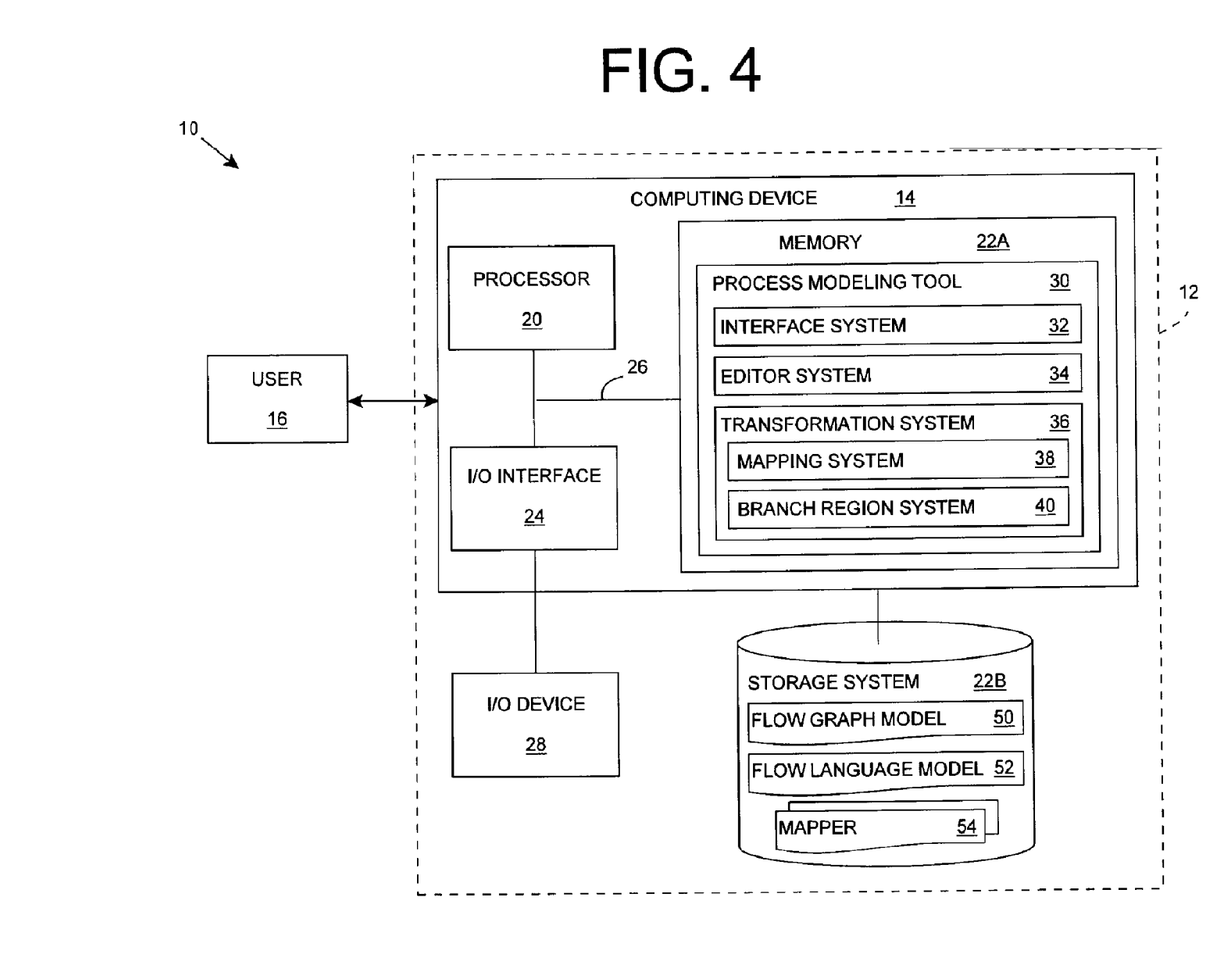
FIG. 4 shows an illustrative environment for transforming a process flow graph model to a process flow language model according to one embodiment of the invention.

As indicated above, the invention provides a solution for transforming a non-structured flow graph model 50A to a well-structured process flow language model. To this extent, FIG. 4 shows an illustrative environment 10 for transforming a process flow graph model 50 to a process flow language model 52. In particular, environment 10 includes a computer infrastructure 12 that can perform the various process steps described herein for transforming flow graph model 50 to flow language model 52. Computer infrastructure 12 is shown including a computing device 14 that comprises a process modeling tool 30, which enables computing device 14 to generate flow language model 52 based on flow graph model 50 by performing the process steps of one embodiment of the invention.

Computing device 14 is shown including a processor 20, a memory 22A, an input/output (I/O) interface 24, and a bus 26. Further, computing device 14 is shown in communication with an external I/O device/resource 28 and a storage system 22B. As is known in the art, in general, processor 20 executes computer program code, such as process modeling tool 30, that is stored in memory 22A and/or storage system 22B. While executing computer program code, processor 20 can read and/or write data, such as flow graph 50, to/from memory 22A, storage system 22B, and/or I/O interface 24. Bus 26 provides a communications link between each of the components in computing device 14. I/O device 28 can comprise any device that enables user 16 to interact with computing device 14 or any device that enables computing device 14 to communicate with one or more other computing devices.

In any event, computing device 14 can comprise any general purpose computing article of manufacture capable of executing computer program code installed by a user 16 (e.g., a personal computer, server, handheld device, etc.). However, it is understood that computing device 14 and process modeling tool 30 are only representative of various possible equivalent computing devices that may perform the various process steps described herein. To this extent, in other embodiments, computing device 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the various embodiments of the invention. For example, in one embodiment, computer infrastructure 12 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

As previously mentioned and discussed further below, process modeling tool 30 enables computing infrastructure 12 to transform a flow graph model 50 to a flow language model 52.

To this extent, process modeling tool 30 is shown including an interface system 32 for managing an interface that enables user 16 to use process modeling tool 30, an editor system 34 that enables user 16 to create, modify, delete, etc., one or more flow graph models 50, and a transformation system 36 that transforms flow graph model 50 to flow language model 52. Transformation system 36 is shown including a mapping system 38 for mapping flow graph model 50 to flow language model 52 and a branch region system 40 for identifying a branch region within flow graph model 50. Operation of each of these systems is discussed further below. However, it is understood that some of the various systems shown in FIG. 4 can be implemented independently, combined, and/or stored in memory for one or more separate computing devices that are included in computer infrastructure 12. To this extent, transformation system 36 could comprise a "plug-in" or the like that is implemented independently of process modeling tool 30 and can interface with multiple types of process modeling tools 30. Further, it is understood that some of the systems and/or functionality may not be implemented, or additional systems and/or functionality may be included as part of environment 10.

In general, process modeling tool 30 enables user 16 to manage a set (one or more) of flow graph models 50. To this extent, interface system 32 can manage a user interface that enables user 16 to manage flow graph model 50. In particular, user 16 can use one or more user interface controls included in the user interface to select a particular flow graph model 50 and/or various operations to be performed by process modeling tool 30 on flow graph model 50. For example, user 16 can select to generate, display, and/or modify flow graph model 50.

In response to this selection, interface system 32 can display an editor within the interface. To this extent, process modeling tool 30 is shown including an editor system 34 that manages one or more editors that enable user 16 to view and/or modify flow graph model 50. In general, editor system 34 will generate an editor for display by interface system 32, which enables user 16 to view and/or modify flow graph models, such as flow graph 50, in a particular graphical model format, such as a UML Activity Graph, or the like. To this extent, editor system 34 will typically store and access flow graph model 50 using a storage object. The storage object can comprise one or more files in a file system, records in a database, memory objects, or the like, that include data for flow graph model 50 based on the definition of the corresponding graphical model format.

Interface system 32 can further receive a transform request for flow graph model 50. The transform request can comprise a request to transform flow graph model 50 to a flow language model 52. The flow language model 52 can comprise a model for the process that is defined by any type of well-structured flow language model format, such as Business Process Execution Language for web services (BPEL). In any event, the user interface managed by interface system 32 could comprise an "export" command or the like, that enables user 16 to request the generation of flow language model 52 based on flow graph model 50. Flow language model 52 can then be managed (e.g., displayed, edited, etc.) using another process modeling tool.

In one embodiment, interface system 32 can generate an interface that enables user 16 to select the "source" flow graph model 50, identify a storage object for storing the "target" flow language model 52, and/or select one of a plurality of well-structured flow language model formats. Alternatively, interface system 32 can support communications between process modeling tool 30 and one or more other systems/program products. In this case, another system/program product can communicate a transform request for flow graph model 50 to process modeling tool 30 using any type of communications solution, such as an application program interface (API), a communications protocol, or the like. It is understood that while process modeling tool 30 has been described as managing a set of flow graph models 50, process modeling tool 30 could instead manage a set of flow language models 52 in the same manner as discussed above. However, in this case, the transform request could comprise an "import" request that seeks to transform a flow graph model 50 generated by, for example, another process modeling tool, to a flow language model 52 that can be managed using process modeling tool 30.

In any event, interface system 32 can provide the transform request to transformation system 36. Subsequently, transformation system 36 can confirm the data in the transform request (e.g., availability of flow graph model 50, specified model format(s), and the like) to ensure that the transformation can be performed. If the transform request cannot be performed, transformation system 36 can generate an error message that is subsequently displayed to user 16 and/or communicated to a requesting system. However, if the transform request can be performed, transformation system 36 can transform flow graph model 50 to flow language model 52.

In transforming flow graph model 50, a simple node in flow graph model 50 may be mapped to a corresponding simple activity in the flow language model format. Similarly, one or more of the three types of regions described above (e.g., sequential region, concurrent branch region, and exclusive branch region) can be mapped to a corresponding structured activity in the flow language model format. For example, when flow language model 52 comprises the BPEL flow language model format, the sequential region can be mapped to a BPEL Sequence activity; the concurrent branch region can be mapped to a BPEL Flow activity; and the exclusive branch region can be mapped to a BPEL Switch activity.

Figure 5:
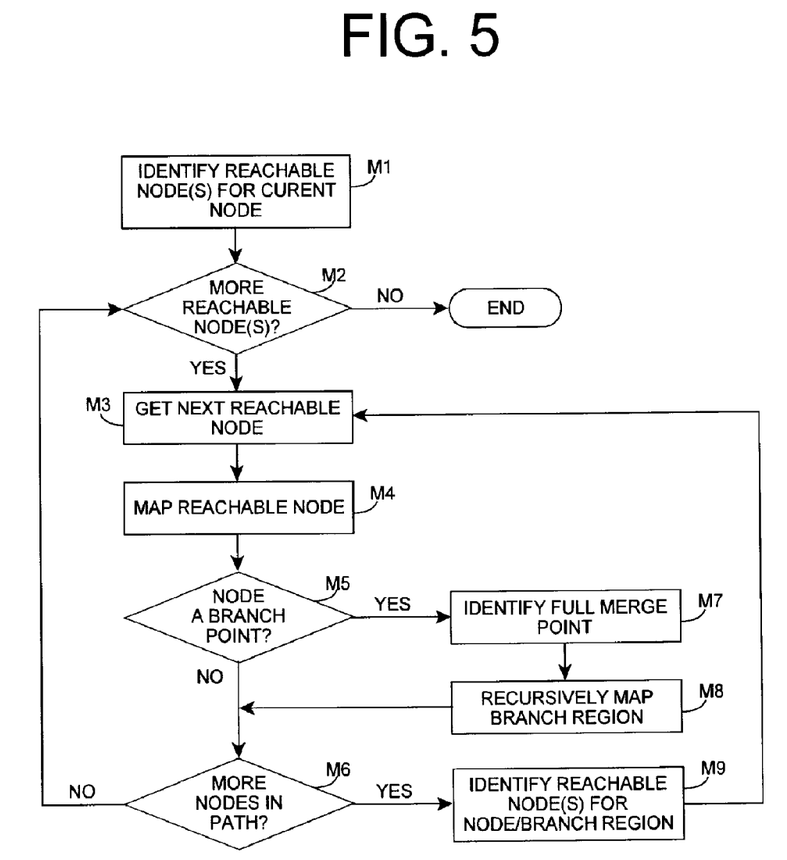
FIG. 5 shows illustrative method steps that can be performed to transform all the nodes of a path according to one embodiment of the invention.

Transformation system 36 can traverse flow graph model 50 to transform it to flow language model 52. For example, FIG. 5 shows illustrative method steps that can be performed to transform all the nodes of a "path" in flow graph model 50. A path comprises a series of nodes that can be traversed within a particular branch region. To this extent, the entire flow graph model 50 can comprise a branch region, and once identified, each branch region within flow graph model 50 will comprise a plurality of paths, one for each branch therein.

Referring to FIGS. 3-5, in step M1 of FIG. 5, transformation system 36 can identify all nodes reachable from the current node. At the start of processing flow graph model 50A, there is no current node, since none of the nodes has been processed. In this case, transformation system 36 can obtain the first node, e.g., node 60A for flow graph model 50A, as the only reachable node. In step M2, transformation system 36 can determine if at least one reachable node continues to require processing. If no reachable node requires processing, then the process ends. However, when at least one reachable node remains, then in step M3, transformation system 36 gets the next reachable node, e.g., node 60B.

Transformation system 36 can provide the reachable node to mapping system 38 for processing. In step M4, mapping system 38 can map the reachable node. In one embodiment, mapping system 38 can determine a node type of the reachable node, e.g., node 60A, and generate a mapper 54 based on the node type. Each mapper 54 can comprise a programmed object or the like that implements the mapping of a particular node type in flow graph model 50A to a particular activity type in flow language model 52. In any event, mapping system 38 and/or mapper 54 can determine the input(s) of node 60A, any processing done by node 60A, and the output(s) of node 60A, and generate one or more activity types in flow language model 52 to implement the same input/output processing.

Further, in step M5, mapping system 38 and/or mapper 54 can determine if the current reachable node comprises a branch point. For example, mapping system 38 and/or mapper 54 can determine a number of outputs for the reachable node, and identify it as a branch point when multiple outputs are included. In any event, when the reachable node is not a branch point, then in step M6, mapping system 38 can determine if there are more nodes in the path being processed. For example, mapping system 38 can determine if the output of the reachable node flows to at least one additional node and that the reachable node does not comprise a full merge node. If both conditions are not true, then the end of the path has been reached and flow returns to step M2. Otherwise, flow continues to step M9, in which mapping system 38 identifies all nodes reachable from the current reachable node and flow returns to step M3.

When processing a sequential region of nodes, this process will repeat for each subsequent reachable node. However, in step M4, when the current reachable node comprises a branch point, mapping system 38 and/or mapper 54 can generate a structured activity in flow language model 52 based on the type of branch point. In step M5, mapping system 38 and/or mapper 54 determines that the reachable node is a branch point, then in step M7, branch region system 40 can identify the corresponding full merge point for the reachable node. For example, when node 60B comprises the reachable node, the corresponding full merge point, e.g., node 60I can be identified by branch region system 40.

Figure 6:
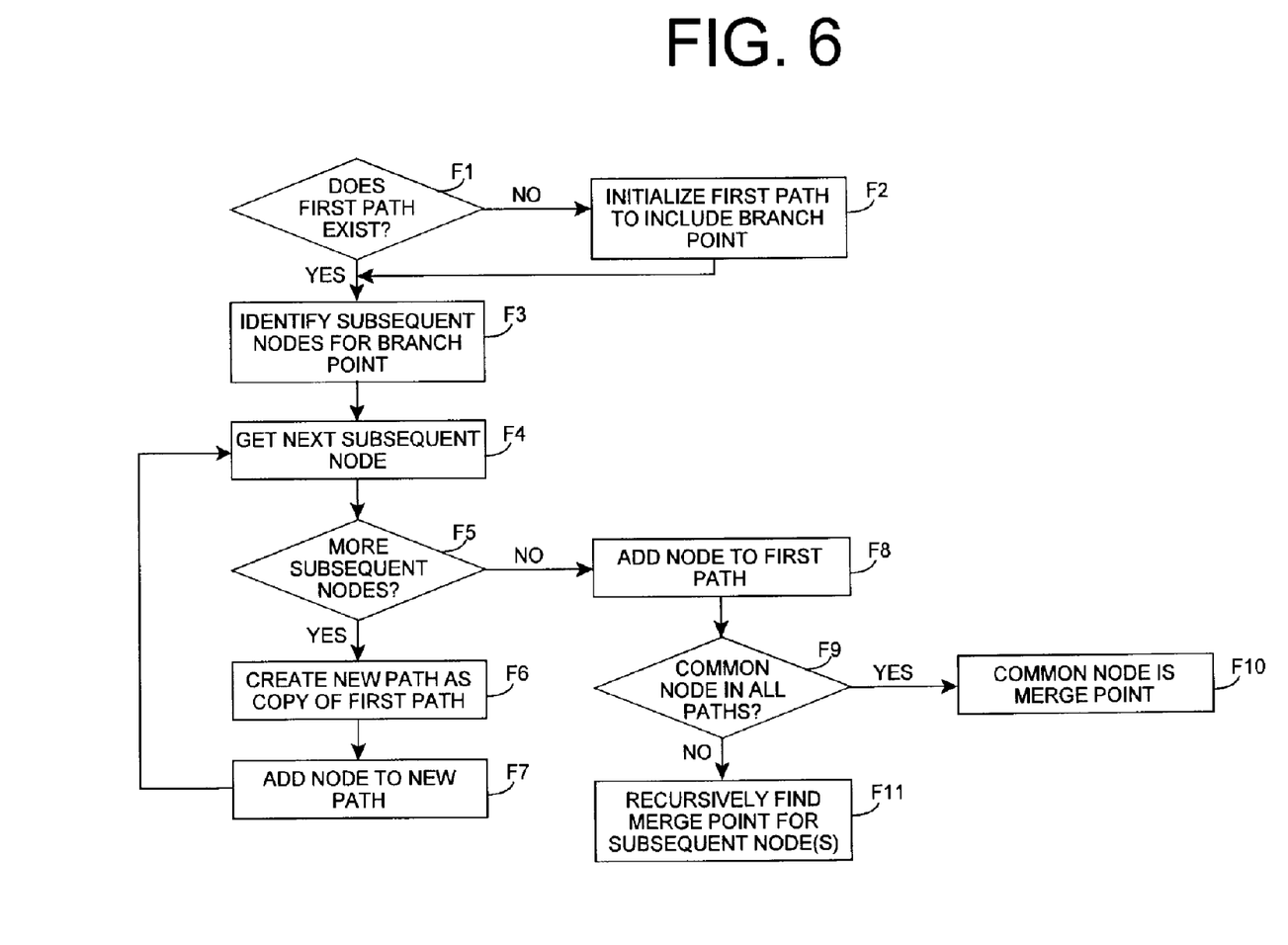
FIG. 6 shows illustrative method steps for identifying a full merge point for a branch point according to one embodiment of the invention.

FIG. 6 shows illustrative method steps for identifying a full merge point for a branch point, which can be performed by branch region system 40 and are discussed in conjunction with FIGS. 3 and 4. As discussed below, these method steps are performed recursively. To this extent, in step F1, branch region system 40 can determine if a first path exists. When initially performed, no path will exist. As a result, in step F2, branch region system 40 can initialize a first path to include the branch point node, e.g., node 60B of flow graph model 50A. In step F3, branch region system 40 identifies all subsequent nodes that are reachable from the branch point, e.g., node 60C and node 60D for node 60B.

Once all reachable subsequent nodes have been identified, in step F4, branch region system 40 selects one of the subsequent nodes, e.g., node 60C, for processing. In step F5, branch region system 40 determines if one or more additional subsequent nodes have not been processed. If so, then in step F6, branch region system 40 creates a new path, which is a copy of the first path, and in step F7, branch region system 40 adds the current subsequent node to the new path and processing returns to step F4. When no more subsequent nodes require processing, then in step F8, the current subsequent node is added to the first path. As a result, after processing each reachable subsequent node for the branch point, a set of paths is generated, one for each of the paths leaving the branch point. For example, for node 60B, a first path would comprise node 60B followed by node 60D, and a second path would comprise node 60B followed by node 60C.

After adding the last subsequent node to a path, in step F9, branch region system 40 determines if the plurality of paths include a common subsequent node. If so, then in step F10, the common subsequent node is returned as the full merge point. Otherwise, in step F11, branch region system 40 recursively performs the process steps for at least one reachable subsequent node until a full merge point is determined. When recursively called, the path corresponding to the reachable subsequent node is provided and is used as the first path during the processing of each subsequent node. However, in step F9, all paths are considered in determining the full merge point. Consequently, when processing subsequent nodes for node 60E, the first path will comprise node 60B, node 60C, and node 60E. A second path will be generated for either node 60F or node 60G, while the other node will be added to the first path. However, when determining a common node in all paths in step F9, the path that includes node 60B and node 60D, which was generated when processing node 60B is also considered.

In any event, once the full merge point is located, branch region system 40 can return it to mapping system 38 and/or mapper 54. Returning to FIGS. 3-5, in step M8 of FIG. 5, mapping system 38 and/or mapper 54 recursively performs the process steps to map the branch region for the reachable node. In particular, the process steps will map each node in the branch region to an activity in the structured activity generated for the branch region using the reachable node as the current node. For example, when processing node 60B in flow graph model 50A, a recursive call will be made to map branch region 64, which will generate one or more activities in the structured activity for node 60B in flow language model 52. While mapping branch region 64, a second recursive call will be made to map branch region 66, which will generate one or more activities in a structured activity for node 60E. To this extent, any number of nested recursive calls can be made to process any number of nested branch regions.

After the branch region for a particular branch point, such as node 60B, has been mapped, flow returns to step M6, in which it is determined if more nodes are in the path being mapped. In making this determination, mapping system 38 and/or mapper 54 jumps the mapped branch region, since all nodes within this region have been mapped in step M8. In one embodiment, mapping system 38 and/or mapper 54 can determine if the full merge point for the branch region has one or more subsequent reachable nodes. If so, then in step M9, mapping system 38 and/or mapper 54 can identify all nodes reachable from the full merge point, and flow can return to step M3.

The process is repeated until all nodes in flow graph model 50A have been mapped. While traversing flow graph model 50A, one or more nodes may be selected for mapping multiple times as a result of a branch. For example, node 60H will be selected after node 60F has been processed and again after node 60G has been processed. In this case, in step M4, mapping system 38 can first determine if the current reachable node has already been mapped. For example, mapping system 38 can determine if a mapper 54 has been created for the particular node. If so, then mapping system 38 can skip mapping the reachable node and processing can flow to step M6.

Figure 7:
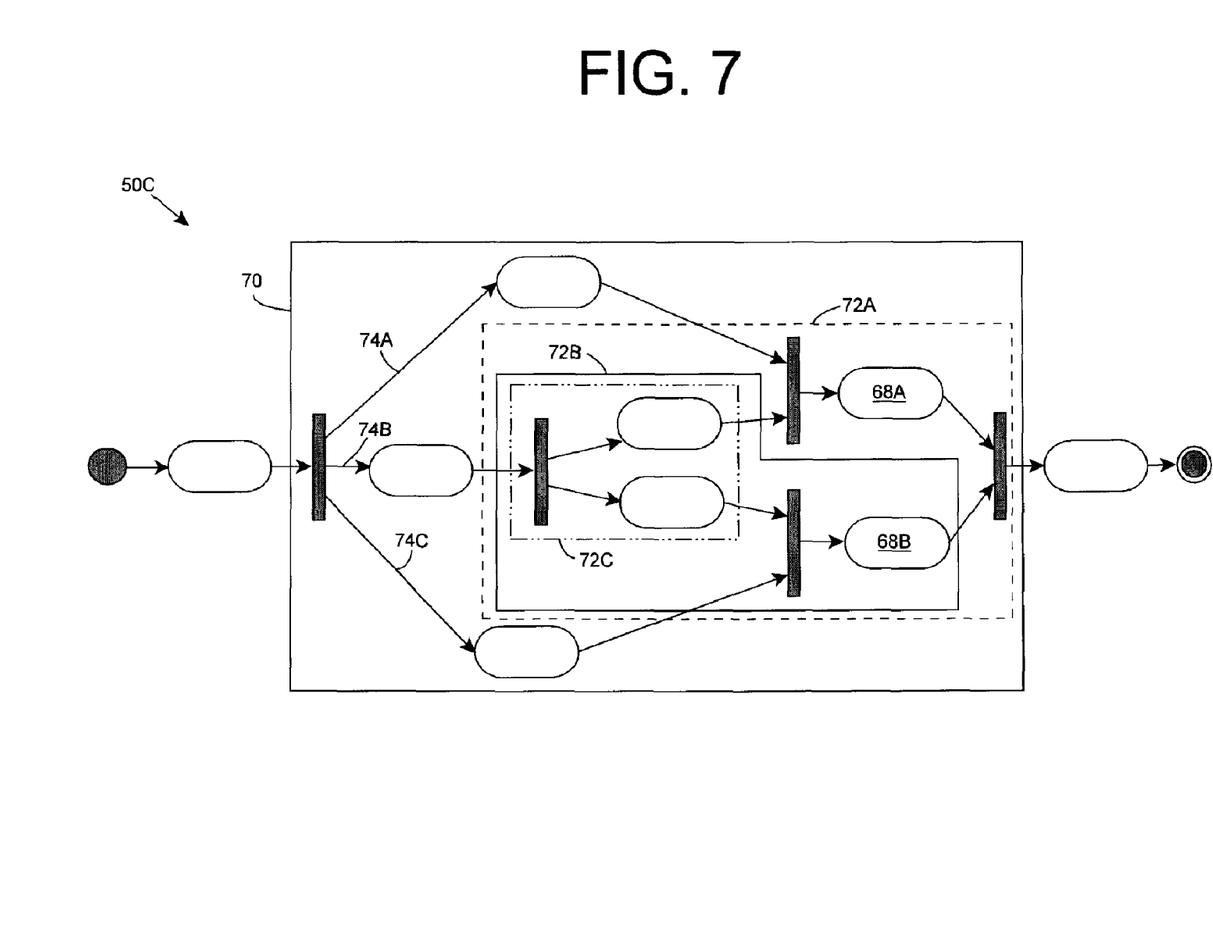
FIG. 7 shows an illustrative flow graph model having a first branch region and several alternative second branch regions.

It is understood that various improvements and/or optimizations can be made to the transformation process described herein. To this extent, for certain flow graph models 50, the structure of the resulting flow language model 52 may be different based on the order in which the branches for a particular branch point are traversed. For example, FIG. 7 shows an illustrative flow graph model 50C having an outer branch region 70 and several alternative inner branch regions 72A-C. Based on the order in which branches 74A-C are traversed, a corresponding one of the alternative inner branch regions 72A-C will result. In particular, processing branch 74B first will yield inner branch region 72A. However, processing branch 74A first, followed by branch 74B will yield inner branch region 72B. Further, processing branch 74B last will yield inner branch region 72C.

In general, it would likely be desirable to have both nodes 68A-B included within the same branch region, e.g., either outer branch region 70 or inner branch region 72A. To avoid inconsistency in mapping such a flow graph model 50C, transformation system 36 (FIG. 4) can manage a set of rules. In one embodiment, the set of rules can comprise one or more alternative rules or one or more rules whose use may or may not be desirable based on the transformation request, flow graph model 50C and/or flow language model 52.

In any event, an illustrative rule could specify that an outer branch region (e.g., outer branch region 70) should include as many nodes 68A-B as possible. In this case, if a node 68A-B can be mapped to an outer branch region 70 and/or an inner branch region 72A-B, it will be mapped to the outer branch region 70. To implement such a rule, the traversal of flow graph model 50C can be modified so that when another branch point is encountered while stepping through a branch 74A-C, the outer branch region 70 is completely traversed before the inner branch region 72C is traversed (e.g., each branch region is traced using a first in first out queue). In this case, when outer branch region 70 has been completely traversed, mapping would continue for each of the identified inner branch region(s) 72C.

While shown and described herein as a method and system for transforming a flow graph to a structured flow language, it is understood that the invention further provides various alternative embodiments. For example, in one embodiment, the invention provides a computer-readable medium that includes computer program code to enable a computer infrastructure to transform a flow graph to a structured flow language. To this extent, the computer-readable medium includes program code, such as process modeling tool 30 (FIG. 4), that implements each of the various process steps of an embodiment of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 4) and/or storage system 22B (FIG. 4) (e.g., a fixed disk, a read-only memory, a random access memory, a cache memory, etc.), and/or as a data signal traveling over a network (e.g., during a wired/wireless electronic distribution of the program code).

In another embodiment, the invention provides a method that performs the process steps of an embodiment of the invention on a subscription, advertising, and/or fee basis. That is, a service provider, such as an Internet Service Provider, could offer to transform a flow graph to a structured flow language as described herein. In this case, the service provider can manage (e.g., create, maintain, support, etc.) a computer infrastructure, such as computer infrastructure 12 (FIG. 4), that performs the process steps of an embodiment of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating an environment for transforming a flow graph to a structured flow language. In this case, a computer infrastructure, such as computer infrastructure 12 (FIG. 4), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 14 (FIG. 4), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of transforming a displayed graphical flow graph model to a structured flow language model, the method comprising:
   via a process modeling tool executing on a computer:
      obtaining, in response to receiving a transform request for the displayed graphical flow graph model represented in a graphical model format, a reachable node in the displayed graphical flow graph model based on a current node by traversing the graphical model format of the displayed graphical flow graph model from the current node;
      mapping the graphical model format of the obtained reachable node in the displayed graphical flow graph model to an activity in the structured flow language model;
      mapping the graphical model format of a branch region for the obtained reachable node in the displayed graphical flow graph model to a structured activity in the structured flow language model, where the branch region comprises a plurality of nodes and each of the plurality of nodes of the branch region is mapped to an additional activity within the structured activity in the structured flow language model in response to determining that the obtained reachable node in the displayed graphical flow graph model comprises a branch point; and
      repeating the obtaining and both mapping steps until all nodes in the displayed graphical flow graph model have been mapped to activities in the structured flow language model.

2. The method of claim 1, further comprising identifying the branch region for the obtained reachable node by traversing the graphical model format of the displayed graphical flow graph model.

3. The method of claim 2, where identifying the branch region by traversing the graphical model format of the displayed graphical flow graph model comprises:
   identifying the branch point in the graphical model format of the displayed graphical flow graph model; and identifying a corresponding full merge point for the branch point in the graphical model format of the displayed graphical flow graph model.

4. The method of claim 3, where identifying the corresponding full merge point for the branch point in the graphical model format of the displayed graphical flow graph model comprises:
   traversing each of a plurality of paths of nodes starting from the branch point in the graphical model format of the displayed graphical flow graph model; and
   identifying a common subsequent node in the graphical model format of the displayed graphical flow graph model that is present in each of the plurality of paths as the corresponding full merge point.

5. The method of claim 4, where identifying the common subsequent node in the graphical model format of the displayed graphical flow graph model that is present in each of the plurality of paths as the corresponding full merge point comprises:
   obtaining a next subsequent node for each of the plurality of paths in the graphical model format of the displayed graphical flow graph model;
   determining if the plurality of paths comprise the common subsequent node prior to reaching at least one subsequent branch point; and
   recursively traversing, for each subsequent branch point, each of the plurality of paths of nodes from each subsequent branch point in the graphical model format of the displayed graphical flow graph model in response to determining that the plurality of paths do not include the common subsequent node prior to reaching the at least one subsequent branch point, where the corresponding full merge point is identified as the common subsequent node in the graphical model format of the displayed graphical flow graph model.

6. The method of claim 1, where mapping the graphical model format of the obtained reachable node in the displayed graphical flow graph model to the activity in the structured flow language model comprises generating a mapper based on a node type for the obtained reachable node.

7. The method of claim 6, where mapping the graphical model format of the branch region for the obtained reachable node in the displayed graphical flow graph model to the structured activity in the structured flow language model is performed by the mapper for the obtained reachable node.

8. The method of claim 1, where mapping the graphical model format of the branch region for the obtained reachable node in the displayed graphical flow graph model to the structured activity in the structured flow language model comprises mapping a second branch region for a second node that comprises a second branch point, where the second branch region comprises an additional plurality of nodes.

9. The method of claim 1, where mapping the graphical model format of the branch region for the obtained reachable node in the displayed graphical flow graph model to the structured activity in the structured flow language model comprises:
   generating the structured activity in the structured flow language model for the obtained reachable node; and
   recursively mapping the graphical model format of each subsequent node of the plurality of nodes in the branch region to the respective additional activity within the structured activity.

10. The method of claim 1, where obtaining, in response to receiving the transform request for the displayed graphical flow graph model represented in the graphical model format, the reachable node in the displayed graphical flow graph model based on the current node by traversing the graphical model format of the displayed graphical flow graph model from the current node comprises jumping the branch region to obtain the reachable node.

11. The method of claim 1, where obtaining, in response to receiving the transform request for the displayed graphical flow graph model represented in the graphical model format, the reachable node in the displayed graphical flow graph model based on the current node by traversing the graphical model format of the displayed graphical flow graph model from the current node comprises:
   identifying a set of next reachable nodes reachable from the obtained reachable node; and
   selecting one of the set of next reachable nodes as a subsequent reachable node.

12. The method of claim 1, further comprising:
   generating, via the process modeling tool executing on the computer, an environment for transforming the displayed graphical flow graph model represented in the graphical model format to the structured flow language model by:
   obtaining a computer infrastructure; and
   for each of the steps of claim 1, deploying a means for performing the step to the computer infrastructure.

13. The method of claim 1, further comprising:
   offering, via the process modeling tool executing on the computer, a service to a customer of transforming the displayed graphical flow graph model represented in the graphical model format to the structured flow language model by:
   managing a computer infrastructure adapted to perform each of the method steps of claim 1; and
   receiving payment based on the managing step.

14. A computer-readable storage medium for enabling a computer infrastructure to transform a displayed graphical flow graph model to a structured flow language model, the computer-readable storage medium comprising computer program code for performing the method steps of claim 1.

15. A system for transforming a displayed graphical flow graph model to a structured flow language model, the system comprising:
   a memory comprising the displayed graphical flow graph model; and
   a processor programmed to:
      obtain, in response to receiving a transform request for the displayed graphical flow graph model represented in a graphical model format, a reachable node in the displayed graphical flow graph model based on a current node by traversing the graphical model format of the displayed graphical flow graph model from the current node;
      map the graphical model format of the obtained reachable node in the displayed graphical flow graph model to an activity in the structured flow language model;
      map the graphical model format of a branch region for the obtained reachable node in the displayed graphical flow graph model to a structured activity in the structured flow language model, where the branch region comprises a plurality of nodes and each of the plurality of nodes of the branch region is mapped to an additional activity within the structured activity in the structured flow language model in response to determining that the obtained reachable node in the displayed graphical flow graph model comprises a branch point; and
      repeat the obtaining and both mapping steps until all nodes in the displayed graphical flow graph model have been mapped to activities in the structured flow language model.

16. The system of claim 15, where the processor is further programmed to identify the branch region for the obtained reachable node by traversing the graphical model format of the displayed graphical flow graph model.

17. The system of claim 15, where in being programmed to map the graphical model format of the obtained reachable node in the displayed graphical flow graph model to the activity in the structured flow language model, the processor is programmed to generate a mapper based on a node type for the obtained reachable node.

18. The system of claim 15, where in being programmed to map the graphical model format of the branch region for the obtained reachable node in the displayed graphical flow graph model to the structured activity in the structured flow language model, the processor is programmed to:
   generate the structured activity in the structured flow language model for the obtained reachable node; and
   recursively map the graphical model format of each subsequent node of the plurality of nodes in the branch region to the respective additional activity within the structured activity.

19. The system of claim 15, where, in being programmed to obtain, in response to receiving the transform request for the displayed graphical flow graph model represented in the graphical model format, the reachable node in the displayed graphical flow graph model based on the current node by traversing the graphical model format of the displayed graphical flow graph model from the current node, the processor is programmed to jump the branch region to obtain the reachable node.

20. A process modeling tool stored on a computer-readable storage medium, comprising:
   a system for managing one of the following: a set of structured flow language models and a set of flow graph models;
   a system for receiving a transform request for a displayed graphical flow graph model represented in a graphical model format; and
   a system for transforming the displayed graphical flow graph model represented in the graphical model format to a structured flow language model, configured to:
      obtain, in response to receiving the transform request for the displayed graphical flow graph model represented in the graphical model format, a reachable node in the displayed graphical flow graph model based on a current node by traversing the graphical model format of the displayed graphical flow graph model from the current node;
      map the graphical model format of the obtained reachable node in the displayed graphical flow graph model to an activity in the structured flow language model; and
      map the graphical model format of a branch region for the obtained reachable node in the displayed graphical flow graph model to a structured activity in the structured flow language model, where the branch region comprises a plurality of nodes and each of the plurality of nodes of the branch region is mapped to an additional activity within the structured activity in the structured flow language model in response to determining that the obtained reachable node in the displayed graphical flow graph model comprises a branch point; and
      repeat the obtaining and both mapping steps until all nodes in the displayed graphical flow graph model have been mapped to activities in the structured flow language model.

21. The process modeling tool of claim 20, where the system for transforming the displayed graphical flow graph model represented in the graphical model format to the structured flow language model is further configured to identify the branch region for the obtained reachable node by traversing the graphical model format of the displayed graphical flow graph model.

22. The process modeling tool of claim 20, where, in being configured to map the graphical model format of the branch region for the obtained reachable node in the displayed graphical flow graph model to the structured activity in the structured flow language model, the system for transforming the displayed graphical flow graph model represented in the graphical model format to the structured flow language model is configured to:
   generate the structured activity in the structured flow language model for the obtained reachable node; and
   recursively map the graphical model format of each subsequent node of the plurality of nodes in the branch region to the respective additional activity within the structured activity.

23. A program product stored on a computer-readable storage medium, which when executed, transforms a displayed graphical flow graph model to a structured flow language model, the program product comprising:
   program code for obtaining, in response to receiving a transform request for the displayed graphical flow graph model represented in a graphical model format, a reachable node in the displayed graphical flow graph model based on a current node by traversing the graphical model format of the displayed graphical flow graph model from the current node;
   program code for mapping the graphical model format of the obtained reachable node in the displayed graphical flow graph model to an activity in the structured flow language model; and
   program code for mapping the graphical model format of a branch region for the obtained reachable node in the displayed graphical flow graph model to a structured activity in the structured flow language model, where the branch region comprises a plurality of nodes and each of the plurality of nodes of the branch region is mapped to an additional activity within the structured activity in the structured flow language model in response to determining that the obtained reachable node in the displayed graphical flow graph model comprises a branch point; and
   program code for repeating the obtaining and both mapping steps until all nodes in the displayed graphical flow graph model have been mapped to activities in the structured flow language model.

24. The program product of claim 23, further comprising program code for receiving the transform request for the displayed graphical flow graph model.

25. The program product of claim 23, further comprising program code for managing one of the following: a set of structured flow language models and a set of flow graph models.

26. The program product of claim 23, further comprising program code for identifying the branch region for the obtained reachable node by traversing the graphical model format of the displayed graphical flow graph model.

* * * * *